(No Model.)

M. SATTLEY.
CULTIVATOR.

No. 406,856. Patented July 9, 1889.

Attest
Helen Graham
W. W. Graham.

Inventor
M. Sattley
By L. P. Graham
his Atty.

UNITED STATES PATENT OFFICE.

MARSHALL SATTLEY, OF TAYLORVILLE, ILLINOIS, ASSIGNOR OF ONE-HALF TO ARCHIBALD SATTLEY, OF SAME PLACE.

CULTIVATOR.

SPECIFICATION forming part of Letters Patent No. 406,856, dated July 9, 1889.

Application filed March 13, 1889. Serial No. 303,129. (No model.)

*To all whom it may concern:*

Be it known that I, MARSHALL SATTLEY, of Taylorville, in the county of Christian and State of Illinois, have invented certain new and useful Improvements in Cultivators, of which the following is a specification.

My invention relates to the shanks and shovels of cultivators, and comprises severally and aggregately the details of construction and combinations of parts hereinafter set forth and claimed, whereby the shanks and shovels may be adjusted at different angles with relation to their respective beams, and whereby the shovels may trip automatically when brought in contact with unyielding obstacles.

Figure 1:
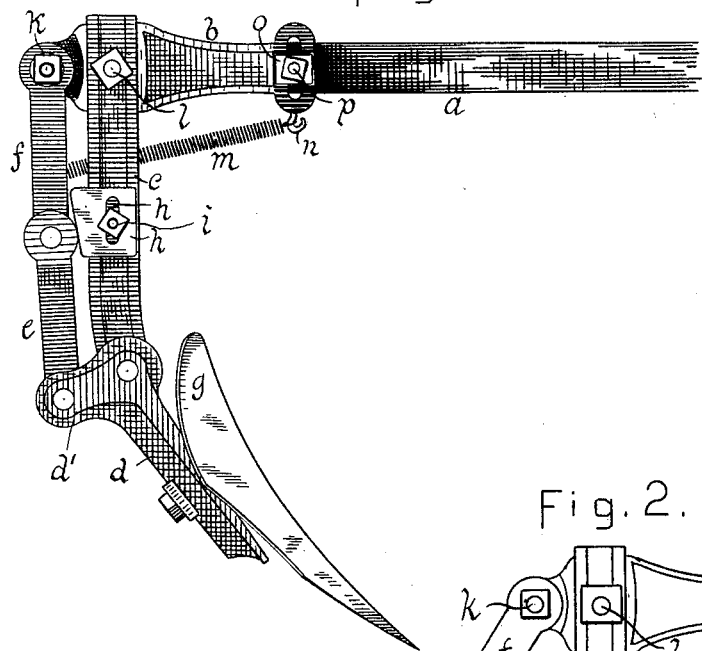
Figure 2:
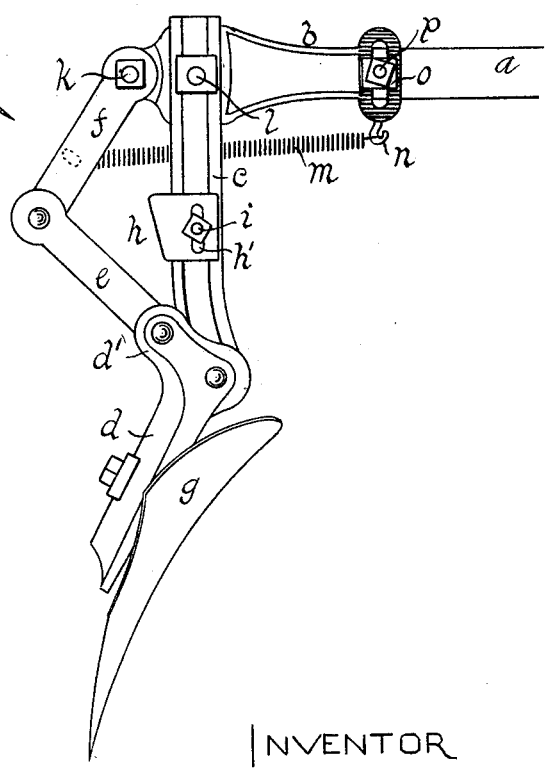
Figure 3:
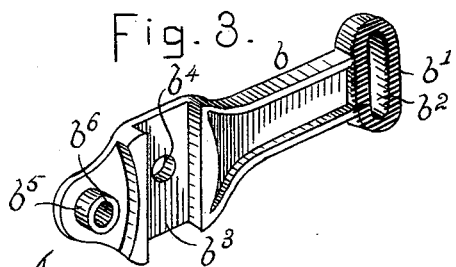

In the drawings accompanying and forming a part of this specification, Figure 1 is a side elevation of my device in operative condition—that is, with the shovel in position to turn the soil. Fig. 2 shows the device with the shovel tripped to ride over an obstacle, and Fig. 3 is a perspective view of the bracket or casting used to carry the shank and trip device.

The beam $a$ is secured to the cultivator-frame in any desirable manner. The bracket $b$ comprises the transversely-recessed head $b^3$, having bolt-hole $b^4$, the boss $b^5$, having bolt-hole $b^6$, and the end $b'$, having the corrugated face and the slot $b^2$. The shank $c$ is in recess $b^3$, and bolt $l$ extends through the shank, the bracket, and the beam $a$. Corrugated plate $o$ fits against and conforms to the corrugated end of the bracket, and bolt $p$ extends through the plate, the slot, and the beam. The sleeve $d$ is pivotally secured to the shank. It carries shovel $g$, and it has the crank-extension $d'$. A toggle-joint composed of bars $e$ and $f$ pivots at one end in the extension $d'$ of sleeve $d$ and at the other end on boss $b^5$ of bracket $b$. A bolt $k$ secures the toggle-joint on the boss, and a spring $m$ connects the central portion of the joint with a hooked projection $n$ on the bracket. Inclined block $h$, having slot $h'$, is secured to the shank by bolt $i$ in a manner permitting longitudinal adjustment on said shank. The inclined face of the block is opposed to the central pivot of the toggle-joint, and its adjustment is such that the central pivot is held somewhat to the rear of a right line drawn through the end pivots. The spring tends to hold the toggle-joint with its pivots as nearly as possible in alignment, and as the resistance of the soil against the action of the shovel is exerted on the toggle-joint very nearly in line with all the pivots thereof the rigidity is sufficient to keep the shovel to its work under all ordinary circumstances. When an unyielding obstacle is struck by the shovel, the force of the spring, though greatly augmented by the toggle-joint, is overcome by the force of the team and the shovel swings backward, as indicated in Fig. 2, and rides over the obstacle. The backward swing of the shovel should be sufficient to enable the last-named result to be readily accomplished, but it should not be sufficient to permit a dead-lock to be formed. Both requirements may be met by properly forming the crank-extension with relation to the sleeve $d$.

A medium between laxity sufficient to permit the shovel to yield in ordinary soil and rigidity sufficient to cause breakage is to be particularly desired, and the block $h$ is of utility in attaining this end. When the trip is too easily made, the block should be moved upward in order to permit the central pivot of the toggle-joint to more nearly approach the shank, and vice versa under contrary circumstances.

Other devices for regulating the toggle-joint as above stated will readily occur to those skilled in the art as mechanical equivalents easily substituted for the block.

The bolt $l$, while securing the bracket and shank to the beam, may also act as a pivot on which the shank and bracket may be swung with relation to the beam. The slot $b^2$ permits to a limited extent such swinging motion, and the plate $o$, when pressed by the tightened bolt against the corrugated end of the bracket, will secure the bracket and shank in any position of adjustment. This feature of the device enables the shovel to be set at various angles with the ground without otherwise altering the relation of parts or affecting their operation. The toggle-joint in its shown position strengthens the shank and trips away from trash that by accumulating in front of the shank could tend to injuriously affect or completely prevent the operation of a joint that tripped in a forward direction.

The arrangement of parts permits the use of an extension spiral spring, which is very desirable, though not absolutely essential, as other forms of springs may be used with a result varying only in degree from that produced by the use of the extension-spring $m$.

The device specified is not designed to be used singly, as will be readily apparent, but a cultivator is to be provided with the customary number of shanks or shovels connected with the frame and operated, with the exceptions specified, in any well-known and desirable manner.

I claim as new and desire to secure by Letters Patent—

1. In cultivators, in combination, a beam, a bracket carrying a shank and secured to the beam, a sleeve pivoted on the shank and carrying a shovel, a toggle-joint connected with the bracket and with the sleeve, a spring to hold the toggle-joint extended, and an adjustable stop between the toggle-joint and the shank, as set forth.

2. The combination, in cultivators, of the bracket having the transverse recess and the boss, the shank held in the recess of the bracket, the sleeve pivotally connected with the shank and carrying a shovel, the toggle-joint pivoted on the boss of the bracket and pivotally connected with the sleeve, a spring to hold the toggle-joint extended, and an adjustable stop interposed between the shank and the toggle-joint, as set forth.

3. The combination, in cultivators, of the bracket having the transverse recess, the boss and the slotted end, the beam, the shank held in the recess of the bracket by a bolt that penetrates the shank, the bracket and the beam, the bolt in the beam extending through the slot of the bracket, the sleeve pivotally connected with the shank and carrying a shovel, the toggle-joint pivoted on the boss of the bracket and pivotally connected with the sleeve, and the extension-spring to extend the toggle-joint, as set forth.

4. In cultivators, in combination, a beam, a shank on the beam, a sleeve pivotally connected with the shank and carrying a shovel, an approximately vertical toggle-joint connecting the sleeve with the beam, and an approximately horizontal extension-spring connected with the beam and with the toggle-joint, near the center thereof, whereby the action of the spring is exerted in the manner and for the purpose set forth.

In testimony whereof I sign my name in the presence of two subscribing witnesses.

MARSHALL SATTLEY.

Attest:
W. R. CALLOWAY,
LOUIS HAKE.